May 22, 1962  E. W. WEAVER  3,035,824
FURNACE WITH COOLED AND RECIRCULATED ATMOSPHERE
Original Filed July 20, 1954

INVENTOR.
E.W. Weaver
BY
Charles S. Haughey
his atty

United States Patent Office 3,035,824
Patented May 22, 1962

3,035,824
FURNACE WITH COOLED AND RECIRCULATED ATMOSPHERE
Ernest W. Weaver, Toledo, Ohio, assignor to Midland-Ross Corporation, Toledo, Ohio, a corporation of Ohio
Continuation of application Ser. No. 444,536, July 20, 1954. This application Feb. 24, 1960, Ser. No. 10,804
2 Claims. (Cl. 263—40)

This invention relates to furnaces of the type wherein a protective atmosphere for work heated therein is generated by the burners supplying heat to the furnace. Such furnaces are commonly used for heat treating non-ferrous work such as copper, in which case bright annealing of the work may be obtained by adjusting the burners to maintain an atmosphere devoid of free oxygen.

As the heat load on the furnace varies and the rate of firing consequently varies, the volume of flue gas produced by the burner, and thus atmosphere gas generated for the heating chamber thereof, will also vary.

To avoid periods of low atmosphere production, and to provide improved atmosphere circulation and control, a stream of atmosphere is withdrawn from the furnace chamber, cooled, and returned to the chamber where it is admixed with freshly produced atmosphere. The extra heat load on the furnace produced by cooling the recirculated atmosphere gas causes the burners to increase their rate of fire and thus increase the volume of atmosphere produced.

For a further consideration of what I believe to be novel and my invention, attention is directed to the drawing, the following portion of the specification and the claims hereinafter.

Figure 1:
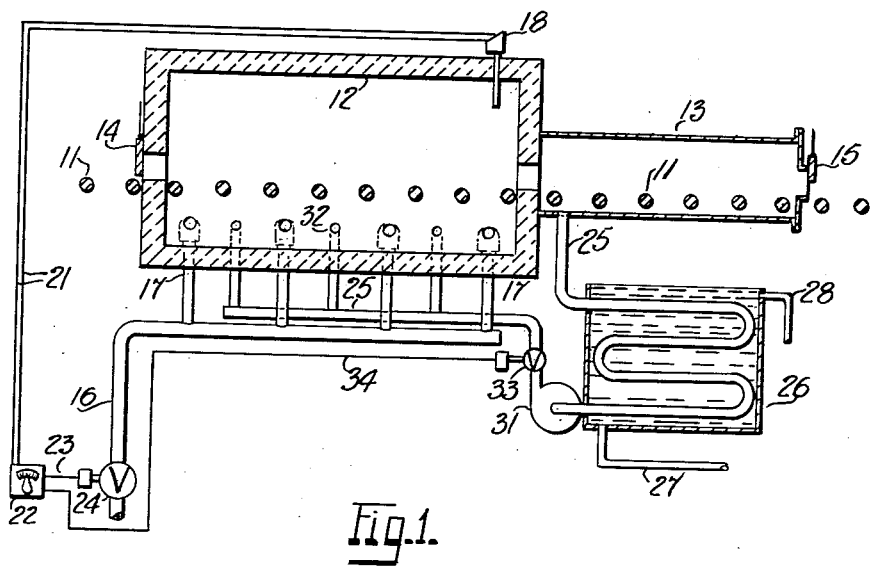
FIG. 1 shows a roller hearth annealing furnace according to this invention.

In FIG. 1 the furnace comprises rollers 11 for advancing work therethrough, the furnace being defined by refractory lined walls 12 forming a heating zone and metal walls 13, which may be refractory lined if desired, forming a cooling zone. The walls 13 may more likely be internally cooled to accelerate cooling of work passing therethrough. Doors 14 and 15 may be provided at the ends of the furnace chamber to at least partially close the chamber to conserve heat and atmosphere and to prevent the influx of atmospheric air.

Fuel is delivered by fuel supply pipe 16 and burner pipes 17 to burners in the heating zone of the furnace, in a longitudinal series of lateral streams of combustion gases and the rate of firing of the burners is controlled responsive to a thermocouple 18 in the furnace walls 12 through wires 21, temperature control instrument 22, conduit 23 and motor operated fuel valve 24 in pipe 16.

Atmosphere is withdrawn from the furnace chamber through a pipe 25 which passes through a heat exchanger 26 which is preferably cooled by flow of water therethrough from water inlet 27 to water outlet 28. A blower 31 in pipe 25 passes atmosphere therein to atmosphere inlets 32, preferably located adjacent the burners in the heating zone to deliver a longitudinal series of lateral streams of cooled atmosphere, and thus provide most effective mixing with the products of combustion. The cooling effect of the recirculated atmosphere is controlled inversely to the firing rate of the furnace burners by adjustment of a motor operated valve 33 in pipe 25 responsive to the temperature control instrument through conduit 34.

The valve 24 may in some cases be desirably disconnected from the control instrument 22 and set to constant firing rate, or responsive to furnace pressure, and the temperature control then would be through valve 33 responsive to the control instrument 22.

Figure 2:
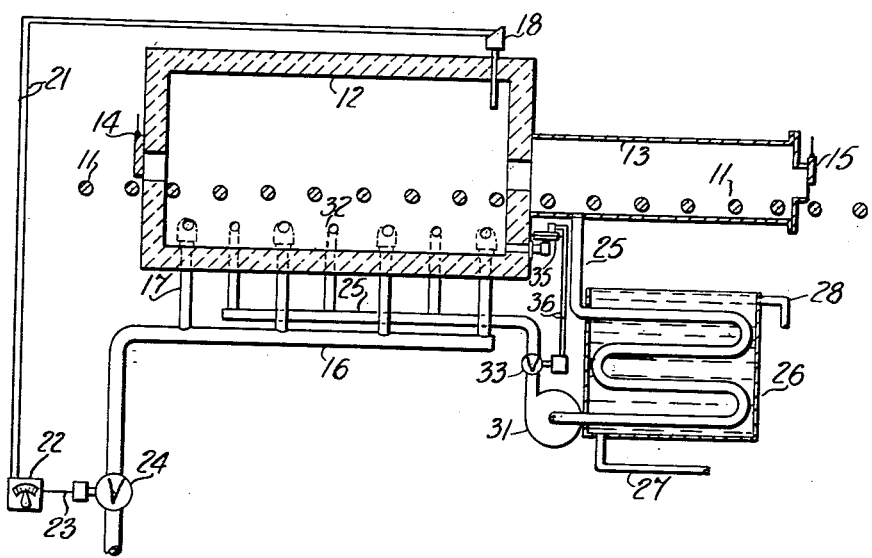
FIG. 2 shows the furnace of FIG. 1 with an alternate control system.

Alternatively, the valve 33 may be made responsive to a diaphragm operated switch 35 through wires 36, the switch diaphragm being responsive to furnace pressure, as shown in FIG. 2.

The cooling effect of the recirculating atmosphere could also be controlled by control of the blower 31 or by varying flow of coolant to the heat exchanger 26.

This application is a continuation of my co-pending application Serial No. 444,536, filed July 20, 1954, now abandoned.

I claim:

1. In a controlled atmosphere heat treating furnace, wall means forming a furnace chamber; a plurality of burners, all of which are effective to fire into and to heat said chamber, and to discharge products of combustion into said chamber to provide a protective atmosphere for work therein; a heat exchanger located outside said chamber; means comprising a blower and duct means for withdrawing a portion of the atmosphere from said chamber and for delivering such withdrawn atmosphere directly through the heat exchanger and from there directly back to said chamber; means effective to maintain a substantially constant chamber temperature by varying the firing of said burners from a high rate to a low rate; and means for inversely varying the rate at which atmosphere is withdrawn from, cooled, and returned to said chamber from a high rate when the burner firing rate is low to a low rate when the burner firing rate is high.

2. In a controlled atmosphere heat treating furnace, wall means forming a furnace chamber; a plurality of laterally spaced burners, all of which are effective to fire through a side wall of, into, and to heat said chamber, and to discharge products of combustion into said chamber to provide a protective atmosphere for work therein; a plurality of laterally spaced nozzles, each of which is positioned adjacent at least one of said burners, and is effective to discharge an atmosphere through a side wall of, and into said chamber; a heat exchanger located outside said chamber; means comprising a blower and duct means for withdrawing a portion of the atmosphere from said chamber and for delivering such withdrawn atmosphere directly through the heat exchanger and from there directly through said nozzles and back to said chamber; means effective to maintain a substantially constant chamber temperature by varying the firing of said burners from a high rate to a low rate; and means for inversely varying the rate at which atmosphere is withdrawn from, cooled, and returned to said chamber from a high rate when the burner firing rate is low to a low rate when the burner firing rate is high.

References Cited in the file of this patent
UNITED STATES PATENTS

| | | |
|---|---|---|
| 1,938,306 | Webb | Dec. 5, 1933 |
| 1,994,220 | Hormel | Mar. 12, 1935 |
| 2,258,515 | Mowat | Oct. 7, 1941 |
| 2,458,624 | Morton et al. | Jan. 11, 1949 |
| 2,628,830 | Kerr | Feb. 17, 1953 |